United States Patent
Pfoertner

(10) Patent No.: US 6,834,105 B2
(45) Date of Patent: Dec. 21, 2004

(54) METHOD FOR OPERATING A PRIVATE TELECOMMUNICATIONS NETWORK

(75) Inventor: Thomas Pfoertner, Hoehenkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 475 days.

(21) Appl. No.: 10/082,827

(22) Filed: Feb. 20, 2002

(65) Prior Publication Data

US 2002/0131577 A1 Sep. 19, 2002

(30) Foreign Application Priority Data

Feb. 23, 2001 (DE) ......................................... 101 08 824

(51) Int. Cl.[7] .............................................. H04M 7/00
(52) U.S. Cl. .................. 379/229; 379/221.15; 379/233; 379/901
(58) Field of Search ....................... 379/112.09, 114.24, 379/114.25, 221.15, 229, 233, 901

(56) References Cited

U.S. PATENT DOCUMENTS

| | | | |
|---|---|---|---|
| 4,400,587 A | 8/1983 | Taylor et al. | |
| 4,953,204 A | 8/1990 | Cuschleg, Jr. et al. | |
| 5,537,470 A * | 7/1996 | Lee ........................ | 379/265.11 |
| 6,567,514 B2 * | 5/2003 | Fleischer et al. ....... | 379/221.03 |

FOREIGN PATENT DOCUMENTS

| | | |
|---|---|---|
| DE | 199 10 195 | 9/1990 |
| DE | 42 02 815 | 9/1993 |
| DE | 44 30 343 | 4/1995 |
| DE | 195 35 540 | 12/1996 |
| DE | 196 37 530 | 3/1998 |
| DE | 197 20 086 | 11/1998 |
| DE | 692 26 716 | 2/1999 |
| DE | 199 29 756 | 1/2001 |

* cited by examiner

*Primary Examiner*—Bing Q. Bui
(74) *Attorney, Agent, or Firm*—Bell Boyd & Lloyd LLC

(57) ABSTRACT

Method for operating a private telecommunications network which is connected via at least one multichannel private branch exchange or a comparable device, in particular a call server or a voice-over IP Gateway, with a plurality of real call numbers to a public telecommunications network, the private branch exchange or comparable device for a multiplicity of real call numbers being assigned a common virtual call number for access from the public network to which a call via a free real call number to the internal terminal of the direct dialing number is switched through.

10 Claims, 1 Drawing Sheet

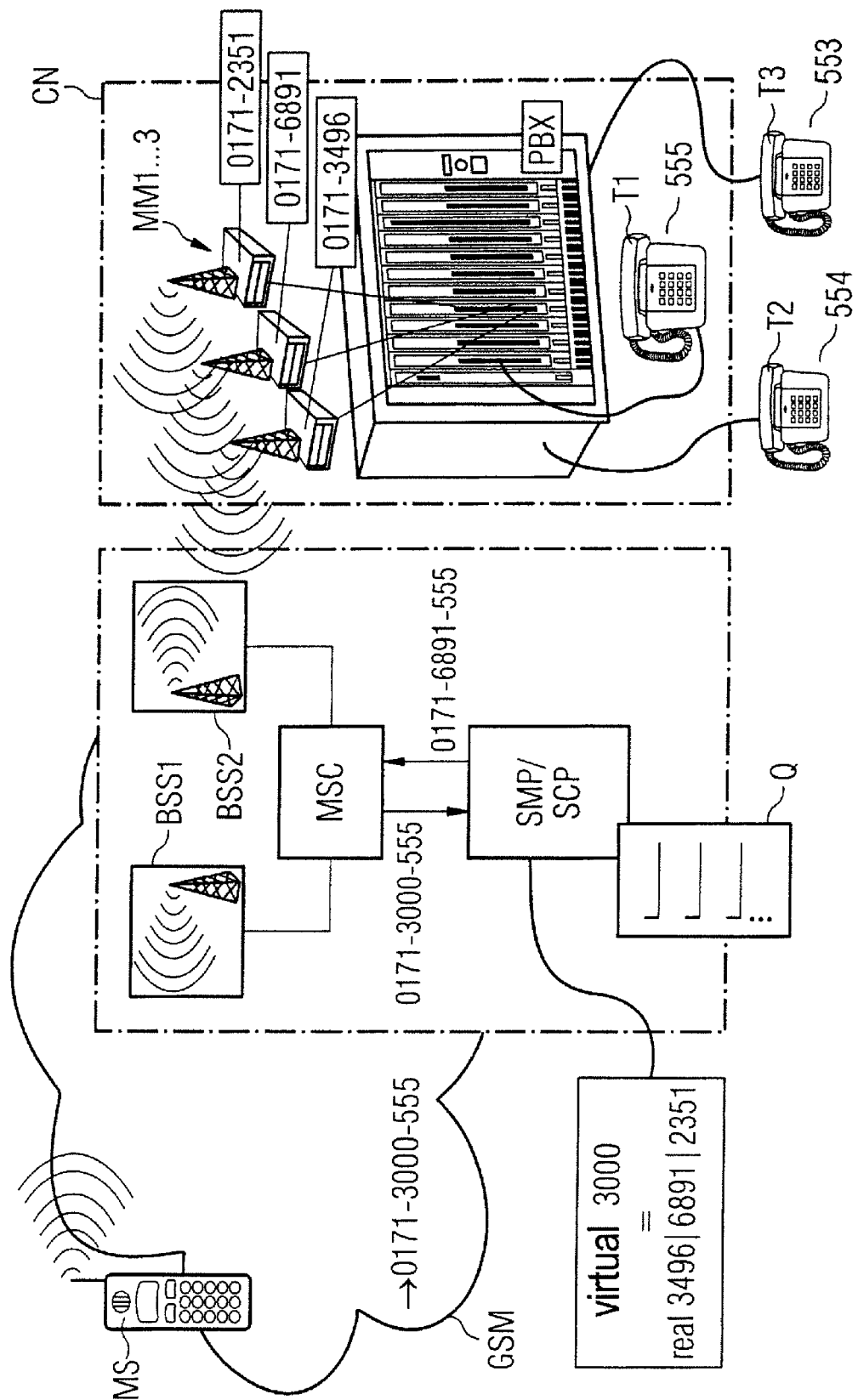

METHOD FOR OPERATING A PRIVATE TELECOMMUNICATIONS NETWORK

BACKGROUND OF THE INVENTION

Within a short time, mobile telecommunications have become a very widespread communications tool which is offering serious competition to established telephone fixed networks and (most importantly) forming a valuable complement to them. As network coverage is being expanded in the industrial countries, the decisive advantage of virtually unrestricted mobility is being exploited to the fullest. Mobile telephones have, therefore, also become a permanent part of the resources for the workers of many companies, organizations and authorities. In addition, companies and institutions within society and social life are increasingly being contacted via means of mobile telephones, even from the outside, as mobile telephones become increasingly widespread.

In this context, the form of the interface between the mobile telephone networks and corporate networks and private branch exchanges is becoming increasingly important. Such an interface should be configured in such a way that subscribers within the corporation or device, that is to say at terminals of the private branch exchange, can be reached as easily and reliably from a mobile telephone network as from a fixed network. In addition, the connection costs should be as low as possible.

However, in this respect, in various countries or telecommunications systems there are still considerable legal, organizational and specific technical restrictions which make access to private networks from mobile telephone networks more difficult.

Thus, in certain countries (for example, South Africa), or owing to restrictions in awarded licenses, it is, under certain circumstances, not possible to implement, in addition to the access into the fixed network in a private branch exchange (PBX), a further access into a mobile telephone network in order to permit calls to be made between the mobile telephone subscribers and subscribers of the private exchange without using the fixed network.

It is known to connect the private branch exchange to a mobile telephone network via a mobile telephone terminal or module which is connected to a private branch exchange. In addition, to increase the capacity of the private branch exchange, a multichannel connection, i.e. connecting a number of mobile telephone modules to one separate call number each, is basically known. However, in this respect there are country-specific legal restrictions; for example, in Germany. In addition, with such an arrangement a caller from the mobile telephone network can discover a free number for dialing into the private branch exchange only by trial and error if he/she dials a busy call number on his/her first dialing attempt. Of course, this constitutes a serious limitation on the usefulness of such a private branch exchange.

The present invention is, therefore, directed toward an improved method of the generic type which makes it possible to dial easily, reliably and cost-effectively into a corporation network from a mobile radio network, and a telecommuncations system with which this method can be executed.

SUMMARY OF THE INVENTION

Accordingly, the present invention includes the essential idea of a private branch exchange or comparable device for direct multichannel radio connection to a mobile telephone network being assigned a virtual call number which is common to all the channels. This idea permits common administration of the real call numbers of the mobile telephone channels of the private branch exchange or comparable device, and thus the automatic selection of a free channel for switching through an incoming call to a terminal of the system.

At the private network end, instead of a private branch exchange it is also possible to provide a multiplicity of private branch exchanges or individual lines which can be reached on a virtual call number (what is referred to as a team number). Furthermore, the method is also suitable for voice transmission over an IP network (VoIP=voice-over IP). Instead of a private branch exchange there is then a call server or a VoIP gateway or a comparable entity at the private end.

This idea also can be applied to the connection of a private branch exchange or comparable device to the fixed network. In this case, of course, the private branch exchanges not assigned a number of mobile telephone modules but rather a number of real lines and call numbers under the "interface" of a common virtual call number. This expanded basic idea of the present invention which includes the connection of a fixed network makes it possible to control the access to corporate networks (call center or the like) from the fixed network, not only (as has been previously known and practiced) as a function of the (geographical) starting point and/or the time of the call, but also as a function of the occupied state of the individual real external lines or call numbers of this network. In this way, better capacity utilization and also cost savings can be achieved in comparison with previously practiced solutions for diverting incoming calls via the public network.

In one preferred embodiment of the proposed solution, a queue of incoming calls is formed in reaction to it being detected that all the real call numbers are busy, and the call is switched through to the desired directly dialed number via the next real call number to become free. In a farther embodiment, the caller can be provided here (in a manner known per se) with a message or interval music or the like to help pass the time while he/she is waiting.

The implementation of the proposed functionality is preferably carried out via an intelligent entity in the public network which is assigned, in particular, to a service administration/service control point there. The implementation will normally essentially take place via software, in which case there are provided, as device aspects, a sensing part for sensing the busy state of the real lines or call numbers and a switching part or control part which is connected to the latter at the input end and have the purpose of selecting a free real call number and switching through the call via said number to the desired internal terminal.

In an additionally advantageous embodiment of the method of the present invention, when there are calls which are outgoing from the private end (from the private branch exchange, from one of the individual lines or from the call server or VoIP gateway), instead of the real number of the calling subscriber another call number is signaled; in particular, the common virtual call number. This can be supplemented in one specific development of this variant with the direct dialing number of the calling subscriber.

Additional features and advantages of the present invention are described in, and will be apparent from, the following Detailed Description of the Invention and the Figures.

BRIEF DESCRIPTION OF THE FIGURES

FIG. 1 shows, in a schematic view, an example of a telecommunications system of the proposed type with a mobile telephone network GSM and a corporate network CN which is connected thereto directly via radio.

DETAILED DESCRIPTION OF THE INVENTION

Referring to FIG. 1, only the components of the two networks GSM, CN which are essential in conjunction with the presentation of the present invention are represented because their design is known to the person skilled in the art and does not require any more detailed explanation.

In the mobile telephone network GSM, there is a mobile telephone MS which is connected via a first base station BSS1 to a mobile switching center MSC. The latter is connected in terms of the exchange of data and control signals to a service management point/service control point SMP/SCP of the mobile telephone network where an assignment between a virtual call number and a multiplicity of real call numbers of a private branch exchange PBX of the corporate network CN is stored in table form. Furthermore, the mobile switching center MSCis connected to a further base station BSS2 via which the mobile telephone network GSM is connected in wirefree fashion to the corporate network CN.

At the corporate network CN end, this connection is established in the example illustrated via three mobile telephone modules MM1 to MM3, to each of which a real call number is assigned. In the example, the call numbers are 0171-2351, 0171-6891 and 0171-3496. The mobile telephone modules MM1 to MM3 are connected, in a manner known per se, to input stages of the private branch exchange PBX and a number of internal terminals T1 to T3 (in the example, three) are connected to the direct dialing numbers 553, 554, and 555. Towards the outside, the private branch exchange has one virtual call number, in the example the number 3000, which is common to all the real channels.

If a mobile telephone subscriber wishes to reach the corporate network CN from the mobile telephone MS, he/she successively dials the network code, the virtual call number of the private branch exchange and the direct dialing number; in the example, therefore, the number 0171-3000-555. The call which is incoming at the mobile switching center MSC is "translated" by reference to the assignment table in the service management/service control point SMP/SCP into, for example, a call which is directed to the real call number 0171-6891-555 and is forwarded to the second base station BSS2 via the mobile switching center MSC in this form. If the real line 6891 of the private branch exchange PBX proves to be busy, this is signaled to the service management/service control point SMP/SCP and the latter makes available a second real call number, assigned to the virtual call number 3000, for forwarding the call via a second channel. If this is also occupied, in the present example a third attempt is started with the third available real call number. If the third line or the third one of the mobile telephone modules MM1 to MM3 is also busy, the call is placed in a queuing device Q and the caller is informed of this. When one of the three channels becomes free, his/her call is switched through to the desired terminal T1 with the direct dialing number 555 using the channel.

The present invention is not restricted to the embodiment of this example, but is also possible in a multiplicity of refinements which lie within the framework of the activity of the person skilled in the art. In particular, the present invention also can, as already mentioned above, be embodied in a corporate network or another private network which is connected to a fixed telephone network. Instead of the service management/service control point SMP/SCP of the mobile telephone network GSM, the management of the virtual call number and the directing of an incoming call via a free real call number is then performed by a corresponding functional unit (server) of the fixed network. It is also to be noted that the present invention also can be implemented without establishing a queue.

Indeed, although the present invention has been described with reference to specific embodiments, those of skill in the art will recognize that changes may be made thereto without departing from the s and scope of the invention as set forth in the hereafter appended claims.

What is claimed is:

1. A method for operating a private telecommunications network which is connected via a connection device having a plurality of real call numbers to a public telecommunications network, the connection device being one of a multichannel private branch exchange, a call server and a voice-over IP Gateway, for establishing a telecommunications link between an external terminal connected to the public network and a plurality of internal terminals connected to the private network, each of the plurality of internal terminals having a direct dialing number, the method comprising the steps of:

assigning the connection device a common virtual call number for access from the public network;

registering at least one of a busy state and a not-in-use state of each of the real call numbers from within the public network when the virtual call number is dialed by the external terminal; and switching through a call to the internal terminal of the dialed direct dialing number via a free real call number.

2. A method for operating a private telecommunications network as claimed in claim 1, the method further comprising the step of forming a queue in response to the registration of the respective busy state and not-in-use state of all the real call numbers, wherein the call is switched through via the next real call number to become free.

3. A method for operating a private telecommunications network as claimed in claim 1, wherein the public network is a mobile radio network and the external terminal is a mobile telephone terminal, access to the connection device being established via a radio link to mobile telephone modules of the private branch exchange.

4. A method for operating a private telecommunications network as claimed in claim 1, the method further comprising the step of controlling the switching through of the call by an intelligent entity in the public network.

5. A method for operating a private telecommunications network as claimed in claim 4, the method further comprising the step of assigning the intelligent entity to a service management point/service control point of the public network, the public network being a mobile telephone network.

6. A method for operating a private telecommunications network as claimed in claim 1, the method further comprising the step of signalling the common virtual call number, in the case of outgoing calls from the connection device, optionally supplemented with the direct dialing number.

7. A telecommunications system, comprising:
a public telecommunications network;
a private telecommunications network;
a connection device having a plurality of real call numbers for connecting the public telecommunications network to the private telecommunications network, the connection device being one of a multichannel private branch exchange, a call server and a voice-over IP Gateway, the plurality of real call numbers of the connection device being assigned one common virtual call number;

a registration part in the public network for detecting at least one of a busy state and a not-in-use state of the real call numbers assigned to the virtual call number; and a switching part in the public network connected downstream of the registration part for switching through a call, directed to the virtual call number, via a real call number which is detected as being free.

8. A telecommunications system as claimed in claim 7, wherein the registration part and the switching part are formed as part of an intelligent entity which is assigned to a service management point/service control point of the public network.

9. A telecommunications system as claimed in claim 7, wherein the public network is a mobile telephone network and an external terminal connected to the public network is a mobile telephone terminal, access to the connection device being implemented via a radio link to mobile telephone modules of the private branch exchange.

10. A telecommunications system as claimed in claim 7, wherein the switching part is provided with a queue device for forming a queue in response to the registration of the busy state of all the real call numbers in order to switch through incoming calls via the next real call number to become free, in an order in which the incoming calls are received.

* * * * *